(12) United States Patent     (10) Patent No.:    US 12,643,409 B2

Bunnell et al.       (45) Date of Patent:     Jun. 2, 2026

(54) VEHICLE BATTERY SYSTEM INCLUDING RESPONSE TO ENERGY EXPENDITURE EVENT

(71) Applicant: GM Global Technology Operations LLC, Detroit, MI (US)

(72) Inventors: Justin Bunnell, Farmington Hills, MI (US); Aniket P. Kothari, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/455,751

(22) Filed: Aug. 25, 2023

(65) Prior Publication Data

US 2025/0065724 A1    Feb. 27, 2025

(51) Int. Cl.

| | |
|---|---|
| *B60L 3/04* | (2006.01) |
| *B60H 1/00* | (2006.01) |
| *B60L 1/02* | (2006.01) |
| *B60L 50/60* | (2019.01) |
| *B60L 53/62* | (2019.01) |
| *B60L 58/12* | (2019.01) |
| *H02J 9/00* | (2006.01) |

(52) U.S. Cl.
CPC ............ *B60L 3/04* (2013.01); *B60H 1/00278* (2013.01); *B60L 1/02* (2013.01); *B60L 50/60* (2019.02); *B60L 53/62* (2019.02); *B60L 58/12* (2019.02); *H02J 9/00* (2013.01); *B60L 2240/549* (2013.01)

(58) Field of Classification Search
CPC .. B60L 3/04; B60L 50/60; B60L 53/62; B60L 58/12; B60L 1/02; B60L 2240/549; B60H 1/00278; H02J 9/00

USPC ........................................................... 307/9.1
See application file for complete search history.

(56) References Cited

U.S. PATENT DOCUMENTS

| | | | | |
|---|---|---|---|---|
| 7,755,329 B2 * | 7/2010 | Kohn | ...................... | B60L 1/003 |
| | | | | 320/152 |
| 8,154,149 B2 * | 4/2012 | King | ...................... | B60L 50/15 |
| | | | | 307/64 |
| 9,079,501 B2 * | 7/2015 | Komiya | ................. | B60L 8/003 |
| 9,511,676 B2 * | 12/2016 | Loftus | ..................... | B60L 1/006 |
| 9,588,528 B2 * | 3/2017 | Schwerman | .............. | G05F 1/56 |
| 2009/0140700 A1 * | 6/2009 | Eberhard | ................ | B60L 58/27 |
| | | | | 320/162 |
| 2010/0072954 A1 * | 3/2010 | Kohn | ................ | H02J 7/007194 |
| | | | | 320/152 |
| 2013/0204471 A1 * | 8/2013 | O'Connell | .............. | B60L 53/68 |
| | | | | 701/22 |
| 2015/0035486 A1 * | 2/2015 | Yamaguchi | ............... | B60L 3/12 |
| | | | | 320/109 |
| 2016/0336881 A1 * | 11/2016 | Marcoccia | .............. | H02P 23/08 |
| 2020/0290461 A1 * | 9/2020 | Lu | ............................. | B60L 3/12 |

(Continued)

*Primary Examiner* — Alfonso Perez Borroto

(74) *Attorney, Agent, or Firm* — CANTOR COLBURN LLP

(57) ABSTRACT

A method for responding to energy expenditure events includes providing electric energy from an external source to a vehicle energy storage component until the energy storage component is charged to a threshold state of charge percentage. An external data source is monitored using a controller for an occurrence of an energy expenditure event in at least one connected system. The controller responds to the occurrence of the energy expenditure event by charging a remainder of the vehicle energy storage component.

7 Claims, 3 Drawing Sheets

(56)        References Cited

U.S. PATENT DOCUMENTS

2020/0294324 A1* 9/2020 Bryan ....................... G06F 1/28
2022/0153158 A1* 5/2022 Barker ................... B60L 53/53
2022/0408531 A1* 12/2022 Sengodan .............. H05B 47/25

* cited by examiner

VEHICLE BATTERY SYSTEM INCLUDING RESPONSE TO ENERGY EXPENDITURE EVENT

INTRODUCTION

The subject disclosure relates to energy storage and charging systems for electric vehicles, and particularly a system for identifying and responding to an energy expenditure event.

Electric and hybrid electric vehicles include energy storage systems, such as battery packs and the like, that store electric energy while the vehicle is non-operational and utilize the stored electric energy while the vehicle is operating. In typical examples, a controller charges the battery to full (100% State of Charge), or as near to full as possible, in preparation for the next vehicle operation. Existing systems typically maximize charging to full as quickly as possible in order to minimize charge time.

The existing systems allow for a vehicle operator to begin operating the vehicle with maximum range potential in as short a time period as possible. However, the existing systems do not allow for the charging profile to be altered to accommodate for external events that may benefit from a safe energy expenditure pathway. As such, it is desirable to create an energy storage and charging system that allows the charging profile of the electric vehicle to be responsive to one or more energy expenditure events occurring in a connected external system.

SUMMARY

In one exemplary embodiment a method including providing electric energy from an external source to a vehicle energy storage component until the energy storage component is charged to a threshold state of charge percentage, monitoring, using a controller, an external data source for an occurrence of an energy expenditure event in at least one connected system and responding to the occurrence of the energy expenditure event by charging a remainder of the vehicle energy storage component.

In addition to one or more of the features described herein, the method includes monitoring whether the energy expenditure event is still present when the remainder of the vehicle energy storage component has been fully charged and one of expending energy from the energy storage component while simultaneously charging the energy storage component such that 0 net current passes through the vehicle energy storage component and disconnecting the vehicle energy storage component from vehicle power systems in response to the energy expenditure event being still present.

In addition to one or more of the features described herein, expending energy from the vehicle energy storage component comprises one of converting energy from the vehicle energy storage component to waste heat, operating a vehicle system or component, and providing energy from the vehicle energy storage component to at least one external device.

In addition to one or more of the features described herein, converting energy from the vehicle energy storage component to waste heat comprises one of operating a vehicle heating ventilation and cooling (HVAC) system, spinning a non-firing engine and operating vehicle power electronics.

In addition to one or more of the features described herein, converting energy from the vehicle energy storage component to waste heat further comprises absorbing waste heat in the vehicle battery such that the vehicle energy storage component operates as a heat sink.

In addition to one or more of the features described herein, operating the vehicle HVAC system comprises at least one of simultaneously operating a heating and a cooling portion of the vehicle HVAC system and simultaneously operating a heating and cooling portion of a power electronics and vehicle energy storage component temperature control system.

In addition to one or more of the features described herein, the energy expenditure event is a fault in a connected energy storage bank, and wherein the connected energy storage bank is a source of charging power for the charging operation.

In addition to one or more of the features described herein, the energy expenditure event is a negative energy rate from a power grid, and wherein the power grid is a source of charging power for the charging operation.

In addition to one or more of the features described herein, expending energy from the energy storage component comprises increasing a power draw from one or more vehicle component auxiliary loads, the one or more vehicle auxiliary loads including at least one of a cabin fan, an under the hood fan, a driving pump, an actuator, a resistive heater, a vehicle light, and an onboard computer module.

In another exemplary embodiment a vehicle includes a propulsion system having at least one electric motor powered by a vehicle energy storage component, a plurality of auxiliary systems configured to receive operational power from one of the vehicle energy storage component and a vehicle power system able to receive power from the vehicle energy storage component, a charger configured to interface with an external power source and provide power to the energy storage component, and a controller configured to control power distribution through the vehicle, the controller including a memory storing instructions for causing the vehicle to direct electric energy from the external power source to a vehicle energy storage component until the vehicle energy storage component is charged to a threshold state of charge percentage, monitor, using the controller, an external data source for an energy expenditure event, and respond to the occurrence of the energy expenditure event by charging a remainder of the vehicle energy storage component.

In addition to one or more of the features described herein, monitoring whether the energy expenditure event is still present when the remainder of the vehicle energy storage component has been fully charged and one of expending energy from the vehicle energy storage component while simultaneously charging the vehicle energy storage component such that 0 net current passes through the vehicle energy storage component and disconnecting the vehicle energy storage component from vehicle power systems in response to the energy expenditure event continuing.

In addition to one or more of the features described herein, expending energy from the vehicle energy storage component comprises one of converting energy from the vehicle energy storage component to waste heat and providing energy from the vehicle energy storage component to at least one external device.

In addition to one or more of the features described herein, converting energy from the vehicle energy storage component to waste heat comprises one of operating a vehicle heating ventilation and cooling (HVAC) system and operating vehicle power electronics.

In addition to one or more of the features described herein, operating the vehicle HVAC system comprises simultaneously operating a heating and a cooling portion of the vehicle HVAC system.

In addition to one or more of the features described herein, the energy expenditure event is one of a fault in a connected energy storage bank, and wherein the connected energy storage bank is a source of charging power for the charging operation, and a negative energy rate from a power grid, and wherein the power grid is a source of charging power for the charging operation.

In addition to one or more of the features described herein, expending energy from the vehicle energy storage component comprises increasing a power draw from one or more vehicle component auxiliary loads, the vehicle auxiliary loads including at least one of a cabin fan, an under the hood fan, a driving pump, an actuator, a resistive heater, a vehicle light, and an onboard computer module.

In another exemplary embodiment, a method includes providing electric energy from an external source to a vehicle energy storage component, monitoring, using a controller, an external data source for an occurrence of an energy expenditure event in at least one connected system external to the vehicle, and responding to the occurrence of the energy expenditure event by expending excess energy using at least one vehicle system.

In addition to one or more of the features described herein, expending energy comprises increasing a power draw from one or more vehicle component auxiliary loads, the vehicle auxiliary loads including at least one of a cabin fan, an under the hood fan, a driving pump, an actuator, a resistive heater, a vehicle light, and an onboard computer module.

In addition to one or more of the features described herein, the energy expenditure event is a fault in a connected energy storage bank, and wherein the connected energy storage bank is a source of charging power for the charging operation.

In addition to one or more of the features described herein, the energy expenditure event is a negative energy rate from a power grid, and wherein the power grid is a source of charging power for the charging operation.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
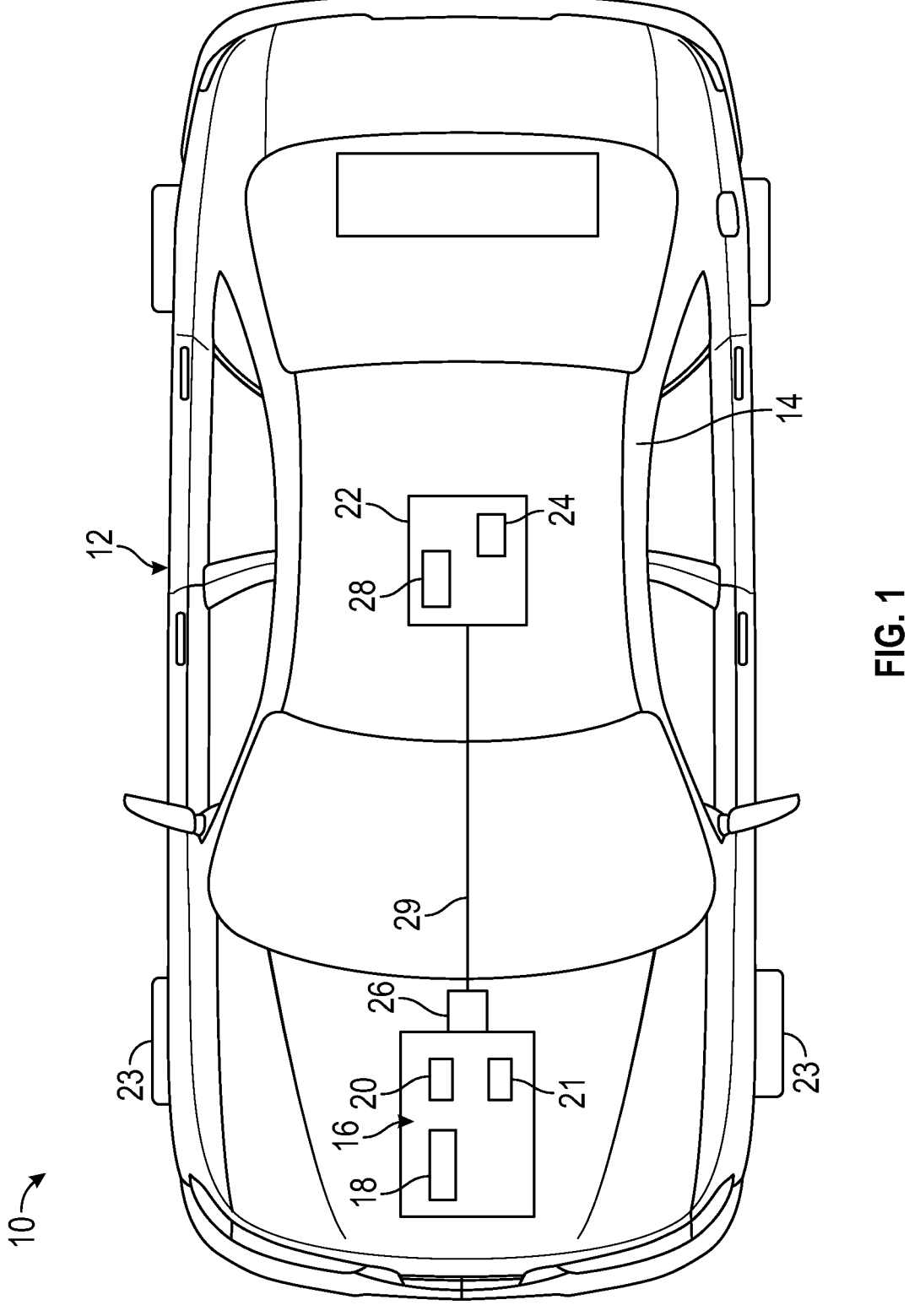
FIG. 1 is a vehicle including a battery-based energy storage system.

The following description is merely exemplary in nature and is not intended to limit the present disclosure, its application or uses. It should be understood that throughout the drawings, corresponding reference numerals indicate like or corresponding parts and features.

As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As used herein an energy expenditure event is an event in which it is desirable to safely expend electrical energy without moving the vehicle.

By way of example, an energy expenditure event can occur when a wall mounted charging station experiences a fault and/or overcharge, a cost for electrical power is a negative value, a power surge occurs, or any similar event occurs where it may be desirable to shunt electric energy from an external source to or through the vehicle power systems.

As used herein a non-operational mode of a vehicle is a mode in which the vehicle is stationary, typically for an extended period of time. Generally non-operational modes occur while the vehicle is parked and the operator is not present.

In accordance with an exemplary embodiment, a battery system controller for an electric or hybrid electric vehicle is configured to charge an energy storage system (e.g. a battery) within the vehicle to a threshold charge level while the vehicle is not operational. The threshold charge level is less than a full charge of the energy storage system. Once charged to the threshold charge level, the charging operation is ceased, reserving the remaining charge capacity of the energy storage system.

Simultaneously, the battery systems controller monitors incoming data from one or more external sources connected to the vehicle for an energy expenditure event. The energy expenditure event can be any condition in which it would be desirable or beneficial for the vehicle to receive and expend external excess energy. The received excess energy is initially used to fill the reserved storage capacity. If the energy expenditure event still exists once the reserve is full, the excess energy is converted to waste heat in the vehicle systems or passed through the vehicle to one or more external systems that are able to utilize the excess energy. In some systems, after the energy expenditure event has passed, the controller causes the vehicle to discharge the energy storage system back to the threshold level and continues monitoring for energy expenditure events.

With continued reference to the general system described above, FIG. 1 shows an embodiment of a motor vehicle 10 including a battery system controller 24 configured to control a battery system. The vehicle 10 includes a vehicle body 12 defining, at least in part, an occupant compartment 14. The vehicle body 12 also supports various vehicle subsystems including a propulsion system 16, a battery system 22, other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels 23 on opposing sides of the vehicle 10. Any number of motors positioned at various additional locations about the vehicle 10 may be used to provide mechanical rotation to corresponding systems and subsystems.

The battery system 22 may be electrically connected to the motors 20 and 21 and/or other components, such as vehicle electronics. The battery system 22 may be configured as a rechargeable energy storage system (RESS), and includes multiple battery cells 28 partitioned into portions. Alternatively, other types of vehicle energy storage components can be utilized to store electrical energy within the battery system 22. A battery system controller 24 is included within the battery system 22 and controls the charging and discharging functions of the batteries within the battery system 22. In alternative configurations, the battery system controller 24 can be a general vehicle controller remote from the battery system 22 and configured to control multiple systems and/or subsystems. The general vehicle controller can be located at any position within the vehicle 10. In yet further alternatives, the battery system controller 24 can be a distributed control system including multiple coordinating controllers throughout the vehicle 10 encompassing controllers within the battery system 22 and controllers remote from the battery system 22.

Figure 2:
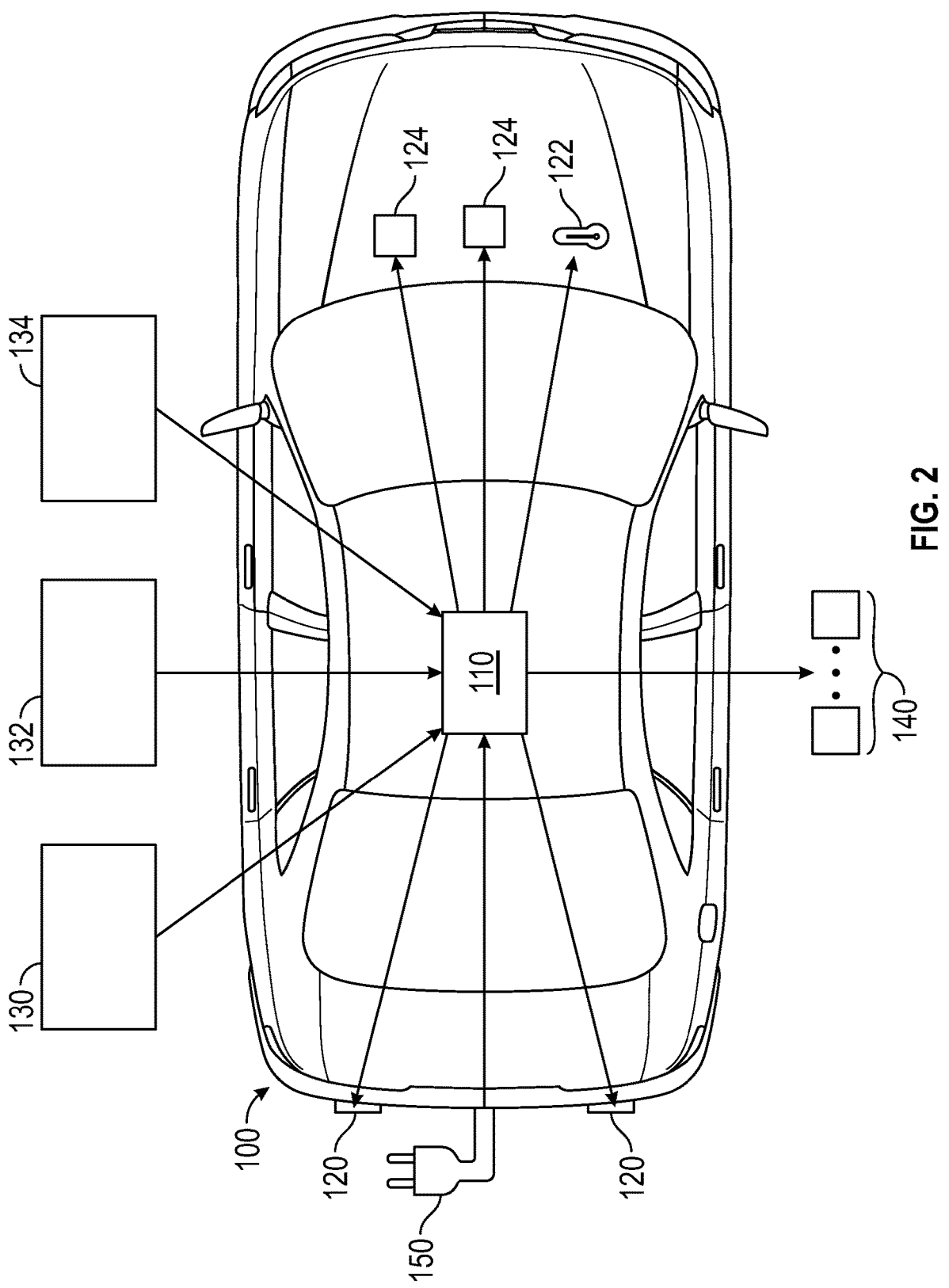
FIG. 2 is the vehicle of FIG. 1 in a charging operation.

With continued reference to FIG. 1, FIG. 2 illustrates a vehicle 100 in a non-operational mode set for charging. The vehicle of FIG. 1 is configured with the systems described and illustrated in FIG. 2, although it is understood that the systems of FIGS. 2 and 3 can be implemented in any manner of vehicle including a controller and a charge system and is not limited to the vehicle of FIG. 1. The vehicle 100 includes a power distribution controller 110 configured to control a distribution of electric power throughout the vehicle 100 and can be the battery system controller 24 (of FIG. 1), a general vehicle controller, a distributed network of vehicle controllers that are in communication with each other, or any other vehicle controller configuration.

The controller 110 controls power distribution to, among other systems, vehicle lights 120, HVAC systems 122, and any number of other auxiliary vehicle systems 124 including fans, interior lights, mirror controls, window actuators, door locks, and any similar powered systems within the vehicle. In addition, the controller 110 controls operation of a charger 150 that is configured to be connected to an external power source and provide electric power to the vehicle. In some examples, the vehicle 100 can be configured to distribute power to one or more external electronic systems 140 and provide power from the vehicle 100 to the external systems 140 while the vehicle 100 is not operating. The power distribution to the external systems can be through the charger 150, via wireless power distribution, through another connection manually made by the vehicle operator, vehicle to load connections in which the vehicle can power 120V/240V outlets that external equipment can plug into and receive power, or any other power connection between the vehicle 100 and the external electronic systems 140.

Power flow within the vehicle is generally described herein as being from the wall to the vehicle through charger 150. It is appreciated that actual power flows will be more complicated and can include multiple steps including power transformations and power transfer between multiple systems. By way of example, large electric motors, heaters, and compressors are powered directly off the high voltage bus (~300V+). For the case of running heated seats in the vehicle (powered off of 12/48V), the heated seats draw 12V power from the low voltage bus, and an Auxiliary Power Module takes high voltage power and converts it to low voltage power. Therefore the power flow in this example is from the external source to the vehicle high voltage bus to the auxiliary power module to the vehicle low voltage bus to the heated seats.

In addition to controlling the power into and out of the vehicle, the controller 110 is able to be connected to one or more external data sources including a data connection to a wall storage unit 130, a data connection to a power grid 132, and/or a data connection to any other data source including internet-based databases, cellular or wifi connections, and/or a direct wired data connections (e.g., USB interfaces, CAN or equivalent onboard diagnostics ports, and the like). In addition, in some examples, a vehicle operator can manually enter data or other information to the controller 110 through a user interface such as a touch screen, a tablet, a cell phone, or any other similar app based device in communication with the controller 24, 110.

The controller 110 includes one or more software modules configured to evaluate the incoming data and identify the occurrence of an event external to the vehicle 100 that would benefit from storage and/or expenditure of electric energy within the vehicle 100, thereby allowing the vehicle 100 to operate as a shunt or passthrough to discharge energy. By way of example, external events can include a fault in a connected wall charger requiring discharge, excess power being provided to a wall charging system, a negative energy rate from a power grid, a fault or thermal runaway event in a stationary storage battery that is connected to the wall charging unit, oversupply of electricity from house-mounted solar/wind sources, or any similar event.

Figure 3:
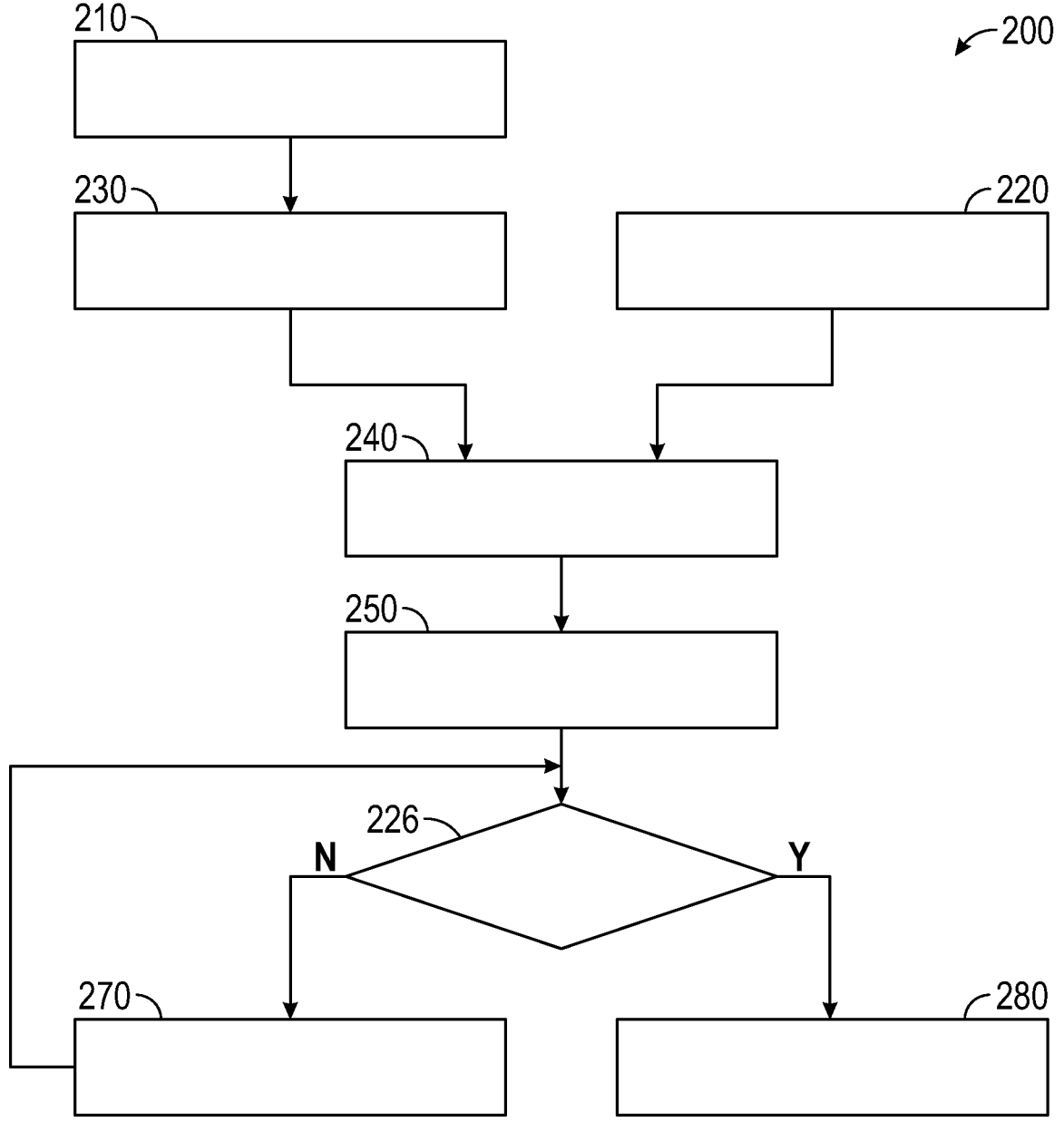
FIG. 3 is a method for charging the vehicle of FIGS. 1 and 2 while allowing the charging profile to be responsive to an energy expenditure event.

With continued reference to the vehicles of FIGS. 1 and 2, FIG. 3 illustrates a process 200 implemented by the battery system controller 24, and/or the vehicle controller 110. The process 200 controls a charging operation of the vehicle 10, 100 while the vehicle 10, 100 is not operating and is configured to engage in a charging operation. A computer module for implementing the process 200 is stored in a controller memory of the controller 24, 110.

In contrast, the process 200 uses an intelligent charging process to reserve charging space within the vehicle battery or other energy storage system to allow the vehicle 10, 100 to assist with energy expenditure events that may occur within one or more systems external to the vehicle 10, 100 that are connected to the vehicle 10, 100 using one or more data connections to the external systems 130, 132, 134.

Initially, a vehicle operator places the vehicle 10, 100 in a charging mode and begins a charging operation at step 210. Simultaneously the vehicle 10, 100 begins receiving data from one or more external system 130, 132, 134 that are connected to the vehicle 10, 100 in a receive data step 220. In an alternate example, the data can be entered manually by an operator through a user interface such as a vehicle touch screen while placing the vehicle 10, 100 in the charge mode or as part of a continuous feed that the vehicle 10, 100 always receives. While charging the vehicle, batteries are charged up to a threshold state of charge (e.g. 80% charged) and the controller 24, 110 stops the charging once the threshold is reached in a reserve storage step 230. As the data from the external source is monitored, the controller 24, 110 monitors for the occurrence of an energy expenditure event and identifies when such an event occurs in an identify condition step 240. The event can be identified using any known process.

When the event is identified, the controller 24, 110 begins charging the reserved portion of the batteries until the portion is charged to a full state of charge in a fill reserve from source step 250. The source of the energy used in this case is the source of the energy expenditure event. By way of example, if the energy expenditure event is a faulty electrical wall storage requiring a power shunt, the vehicle fills the reserve from the wall storage, thereby shunting energy from the wall storage. In another example, when the energy expenditure event is a negative energy cost on power drawn from the power grid, the vehicle fills the reserve using the power grid.

Once the reserve portion has been filled, the controller 24, 110 checks to see if the energy expenditure event is resolved (no longer present) in a check 266. When the energy expenditure event is resolved, the controller 24, 110 ends the charging operation at step 280. In one alternate example, the check 266 checks to see if the energy expenditure event has been resolved or the reserve portion has been filled. In this example, the controller 24, 110 ends the charging operation at step 280 when either event has occurred.

Alternatively, if the energy expenditure event is ongoing once the reserve storage capacity has been filled, the controller 24, 110 causes the vehicle to expend energy simultaneously with charging the vehicle battery from the source of the energy expenditure event in step 270 such that 0 net current passes through the battery.

In another example, when the battery is fully charged, the vehicle battery is disconnected from the vehicle power systems, and the power systems operate as a pass through to directly power other high voltage vehicle components (e.g., heaters, motors, compressors and the like) using wall power.

The energy expenditure can take the form of operating vehicle systems in a non-productive manner. The non-productive expenditure of energy using vehicle systems can occur in multiple ways. In one example, the vehicle 10, 100 operates as a pass through and converter and provides energy a second external component such as a battery bank, a power grid, a household power system and the like. In another example the energy can be expended by operating a vehicle HVAC system while the vehicle does not have any occupants. The heating system, cooling system or both may be operated, thereby expending energy. In yet another example, energy can be expended by simultaneously operating a heating and cooling portion of a power electronics and vehicle energy storage component temperature control system. In yet another example, the energy is expended by operating one or more auxiliary vehicle systems including, but not limited to, window actuators, door locks, cabin fans, under the hood fans, power electronics, disengaged motors, driving pumps, resistive heaters, a steering wheel, heated glass panels, heated mirrors, a light (such as a headlight), a computer/module onboard the vehicle or any other system. It is further appreciated that the described modes of energy expenditure are not exhaustive, and each mode can be utilized alone or in any combination with the other listed modes and/or alternative modes of energy expenditure.

In another example, the expenditure can take the form of the vehicle operating as a passthrough and directing the excess energy from the source of the energy expenditure event to one or more additional systems 140 external to the vehicle. In the example of a single vehicle charging from a power grid via a wall plug, the external systems 140 may include a home electrical system, a wall mounted electrical storage device, or any similar systems.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary within, schematic representations do not correspond one to one with physical structures, and the relative positioning, size, orientation, or other configurations of the components within the schematic representation are not limiting.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:

a propulsion system having at least one electric motor powered by a vehicle energy storage component;

a plurality of auxiliary systems configured to receive operational power from one of the vehicle energy storage component and a vehicle power system able to receive power from the vehicle energy storage component;

a charger configured to interface with an external power source and provide power to the vehicle energy storage component; and a controller configured to control power distribution through the vehicle, the controller including a memory storing instructions for causing the vehicle to:

direct electric energy from the external power source to a vehicle energy storage component until the vehicle energy storage component is charged to a threshold state of charge percentage, monitor, using the controller, a data source external to the vehicle for an occurrence of an energy expenditure event external to the vehicle respond to the energy expenditure event by charging a remainder of the vehicle energy storage component, and and monitor, using the controller, whether the energy expenditure event is still present when the remainder of the vehicle energy storage component has been fully charged and includes expending energy from the vehicle energy storage component while simultaneously charging the vehicle energy storage component such that 0 net current passes through the vehicle energy storage component by simultaneously operating a heating and a cooling portion of the vehicle HVAC system.

2. The vehicle of claim 1, wherein the energy expenditure event is one of:
   a fault in a connected energy storage bank wherein the connected energy storage bank is a source of charging power for a charging operation, and
   a negative energy rate from a power grid wherein the power grid is a source of charging power for the charging operation.

3. The vehicle of claim 1, wherein expending energy from the vehicle energy storage component comprises: increasing a power draw from one or more vehicle component auxiliary loads, the vehicle auxiliary loads including at least one of a cabin fan, an under hood fan, a driving pump, an actuator, a resistive heater, a vehicle light, and an onboard computer module.

4. The vehicle of claim 1, wherein the external data source is an internet-based database.

5. The vehicle of claim 1, wherein the external data source is a data connection to a power grid.

6. The vehicle of claim 1, wherein the memory further stores instructions for cause the controller to respond to the energy expenditure event by receiving excess electrical energy from the external power source and directing the excess electrical energy to at least one additional system external to the vehicle, such that the vehicle operates as a passthrough.

7. The vehicle of claim 6, wherein the at least one additional system external to the vehicle includes one of a home electrical system and a wall mounted electrical storage device.

* * * * *